US012594615B2

(12) United States Patent　　　　(10) Patent No.: US 12,594,615 B2

Inoue　　　　　　　　　　　　　　　(45) Date of Patent: Apr. 7, 2026

(54) WIRE ELECTRIC DISCHARGE MACHINING APPARATUS

(71) Applicant: Sodick Co., Ltd., Kanagawa (JP)

(72) Inventor: Hirotoshi Inoue, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 712 days.

(21) Appl. No.: 18/072,708

(22) Filed: Dec. 1, 2022

(65) Prior Publication Data

US 2023/0191516 A1　　Jun. 22, 2023

(30) Foreign Application Priority Data

Dec. 16, 2021　(JP) ................................. 2021-203977

(51) Int. Cl.
　　B23H 11/00　　　　(2006.01)
(52) U.S. Cl.
　　CPC .................................. B23H 11/006 (2013.01)
(58) Field of Classification Search
　　None
　　See application file for complete search history.

(56) References Cited

FOREIGN PATENT DOCUMENTS

| JP | 62130129 | A | * | 6/1987 |
| JP | S62130129 | | | 6/1987 |
| JP | 2552851 | | | 11/1996 |
| JP | 2521251 | | | 12/1996 |
| KR | 20140066823 | A | * | 6/2014 | ............. B23H 7/105 |
| KR | 1020140066823 | | | 6/2014 |
| KR | 20140080768 | | | 7/2014 |

OTHER PUBLICATIONS

Translation of KR-20140066823-A (Year: 2014).*
Translation of JPS62130129 (Year: 1987).*

* cited by examiner

*Primary Examiner* — Elizabeth M Kerr
(74) *Attorney, Agent, or Firm* — JCIPRNET

(57) ABSTRACT

A wire electric discharge machining apparatus includes a wire electrode and upper and lower guide devices guiding the wire electrode, and includes: a power conductor moving in a first direction as a horizontal axis direction and supplying power by contacting the wire electrode; and a fixing device fixing the power conductor in the lower guide device and switchable between a fixed state, in which a movement of the power conductor relative to the lower guide device in a second direction as another horizontal axis direction orthogonal to the first direction is not possible, and a non-fixed state in which such relative movement is possible. The wire electric discharge machining apparatus includes: a pressing device, movable relative to the lower guide device and pressing the power conductor in the non-fixed state to move in the second direction; and a movement device, moving the pressing device relative to the lower guide device.

11 Claims, 12 Drawing Sheets

4

44

43

43c2

42

43b

42d2

43a2

43a1

43a

42e

42b

41

41a

WIRE ELECTRIC DISCHARGE MACHINING APPARATUS

CROSS-REFERENCE TO RELATED APPLICATION

This application claims the priority benefit of Japanese Application Serial No. 2021-203977, filed on Dec. 16, 2021. The entirety of the above-mentioned patent application is hereby incorporated by reference herein and made a part of this specification.

BACKGROUND

Technical Field

The invention relates to a wire electric discharge machining apparatus.

Description of Related Art

A wire electric discharge machining method is a machining method in which electric discharge is intermittently and repeatedly generated between a machining gap formed between a wire electrode, which is a tool electrode, and a workpiece to cut the workpiece in a desired shape by using electric discharge energy. In general, the wire electrode is positioned with respect to the workpiece by using a pair of wire guides provided to sandwich the workpiece that is disposed horizontally. During machining, the wire electrode is guided by the pair of wire guides and runs along a predetermined running path at a predetermined feed-out speed, and an unused portion of the wire electrode is constantly supplied to the machining gap. A power conductor electrically connected to one of the poles of a machining power source is accommodated in at least one of an upper guide device and a lower guide device respectively including the wire guides, and a current is supplied to the wire electrode by bringing the power conductor into contact with the wire electrode.

The power conductor is, for example, formed by a conductive metal material with a wear resistance, such as tungsten carbide. However, the power conductor is worn out due to the contact with the running wire electrode for a long time, and is no longer capable of supplying a sufficient current to the wire electrode. Therefore, the power conductor is replaced with a new power conductor after being used for a predetermined time. At this time, depending on the shape of the power conductor, it is possible to use the power conductor as long as possible by changing the position where the power conductor contacts the wire electrode without directly replacing the power conductor. In the wire guide device disclosed in Patent Document 1, it is possible to change the contact state between the power conductor and the wire electrode by manually shifting the power conductor in a support hole formed therein.

PRIOR ART DOCUMENTS

Patent Documents

[Patent Document 1] Japanese Utility Model Registration No. 2521251.

In the wire guide device as disclosed in Patent Document 1, when changing the position of the power conductor contacting the wire electrode, the operator uses a specialized tool to loosen a setscrew and release the power conductor from a fixed state, and slides the power conductor by a predetermined amount in a horizontal axis direction orthogonal to the wire electrode stretched in a vertical direction and then fix the power conductor again. At this time, peripheral components, such as a machining tank wall, a machining head, an automatic wire threading device, a work stand, etc., are provided around the guide device, and may become obstacles for the operation. Specifically, when changing the position of the power conductor in the lower guide device disposed on the lower side of the workpiece, it is difficult for the hand of the operator to reach the lower guide device, and it is difficult for the operator to handle the tool as well, causing a significant burden to the operator. Therefore, it is favorable that the burden of the operator be alleviated and the work time be reduced in a process in which the power conductor slides to change the position.

SUMMARY

A wire electric discharge machining apparatus includes a wire electrode, an upper guide device, and a lower guide device. The upper guide device and the lower guide device are respectively disposed on an upper side and a lower side of a workpiece to sandwich the workpiece along a vertical direction, and guide the wire electrode. The lower guide device comprises a power conductor, and a fixing device fixing the power conductor at a predetermined position in the lower guide device. The power conductor moves in a first direction that is a horizontal axis direction and supplies power by contacting the wire electrode. The fixing device is configured to be switchable between a fixed state, in which a relative movement of the power conductor with respect to the lower guide device in a second direction that is another horizontal axis direction orthogonal to the first direction is not possible, and a non-fixed state in which the relative movement of the power conductor with respect to the lower guide device in the second direction is possible. The wire electric discharge machining apparatus includes: a pressing device, configured to be relatively movable with respect to the lower guide device and press the power conductor in the non-fixed state to move in the second direction; and a movement device, relatively moving the pressing device with respect to the lower guide device.

DESCRIPTION OF THE EMBODIMENTS

Figure 1:
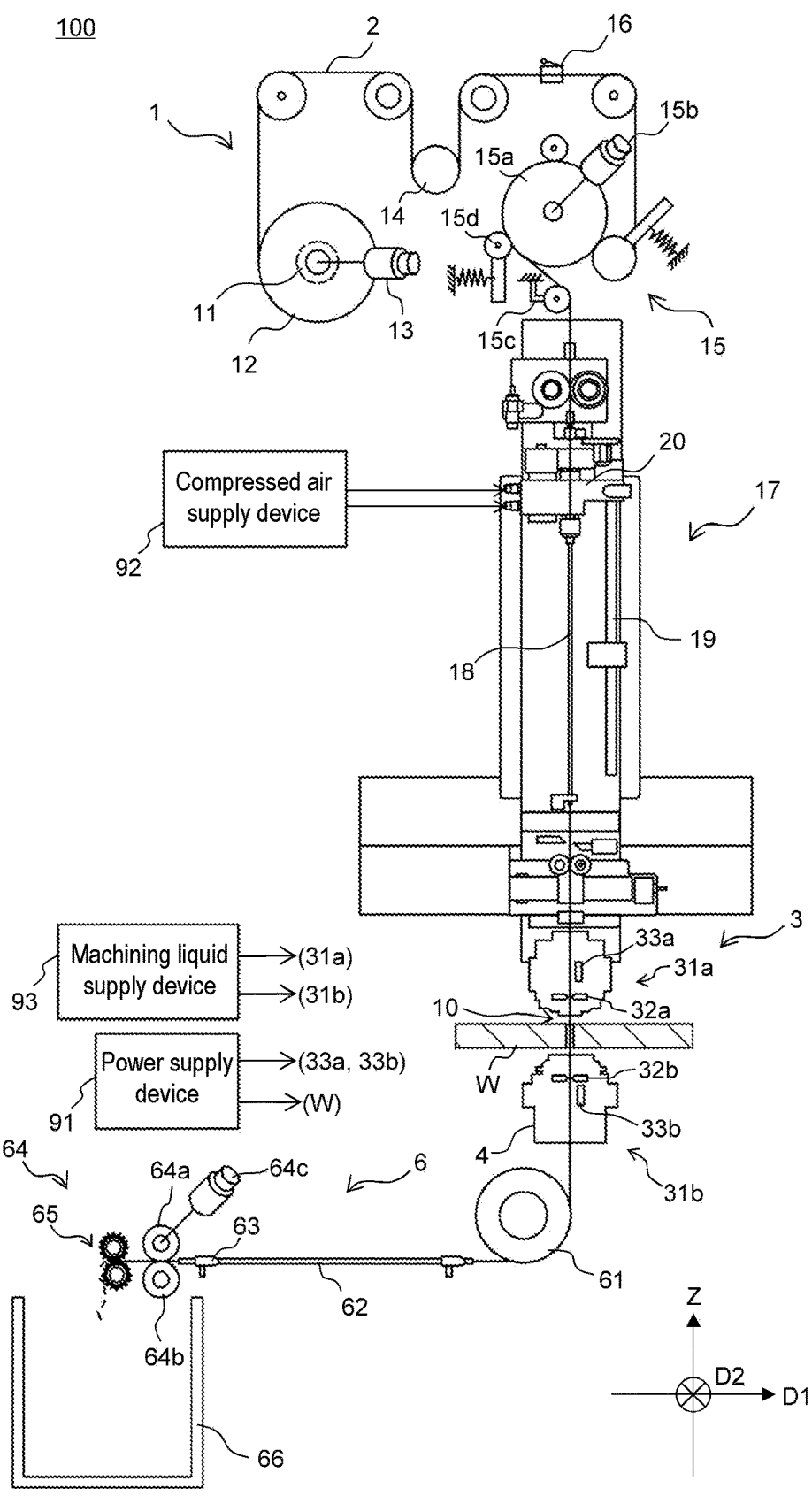
FIG. 1 is a schematic view illustrating a wire electric discharge machining apparatus 100 according to an embodiment of the invention.
Figure 2:
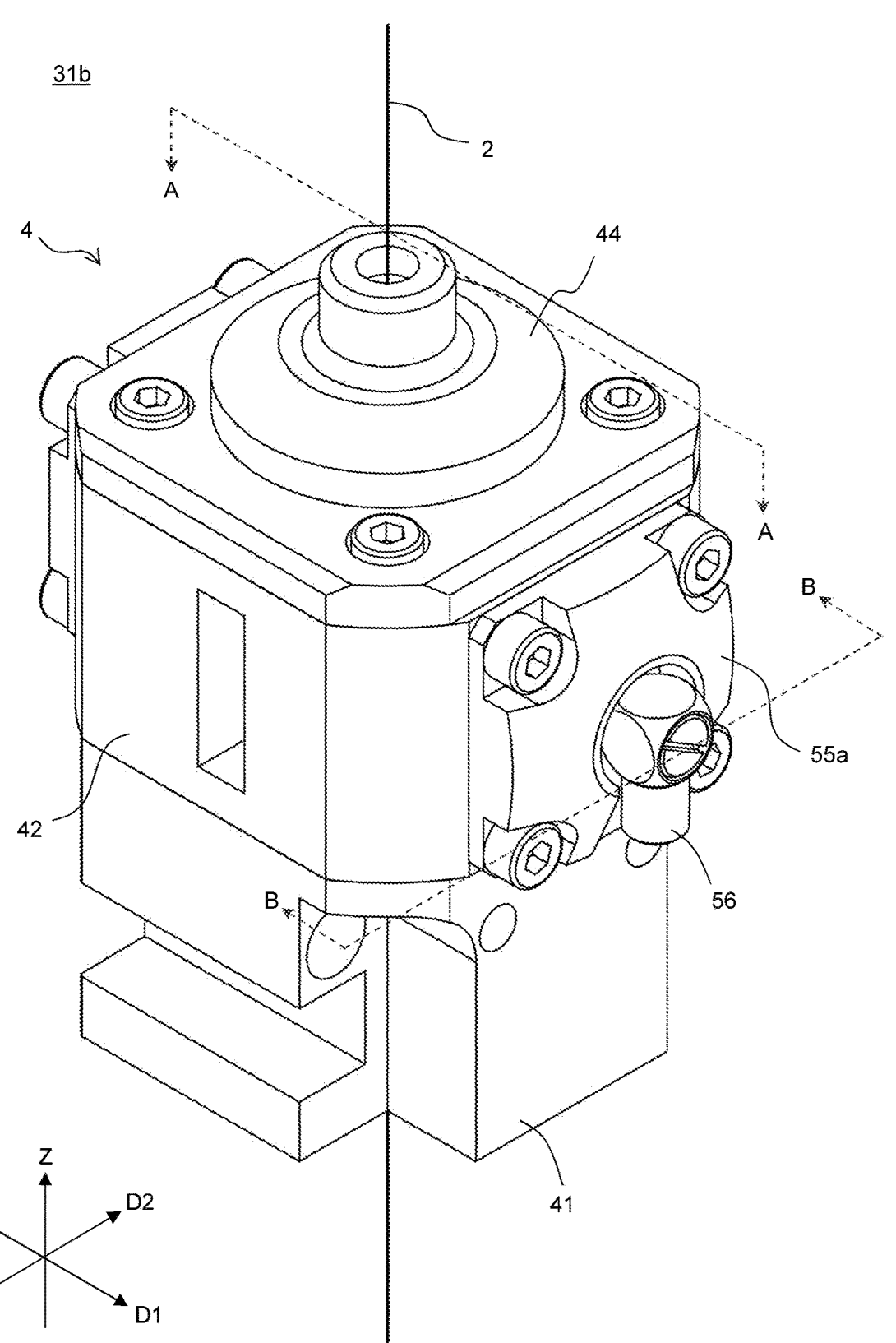
FIG. 2 is a perspective view illustrating a lower guide device 31b when viewed from the top.
Figure 3:
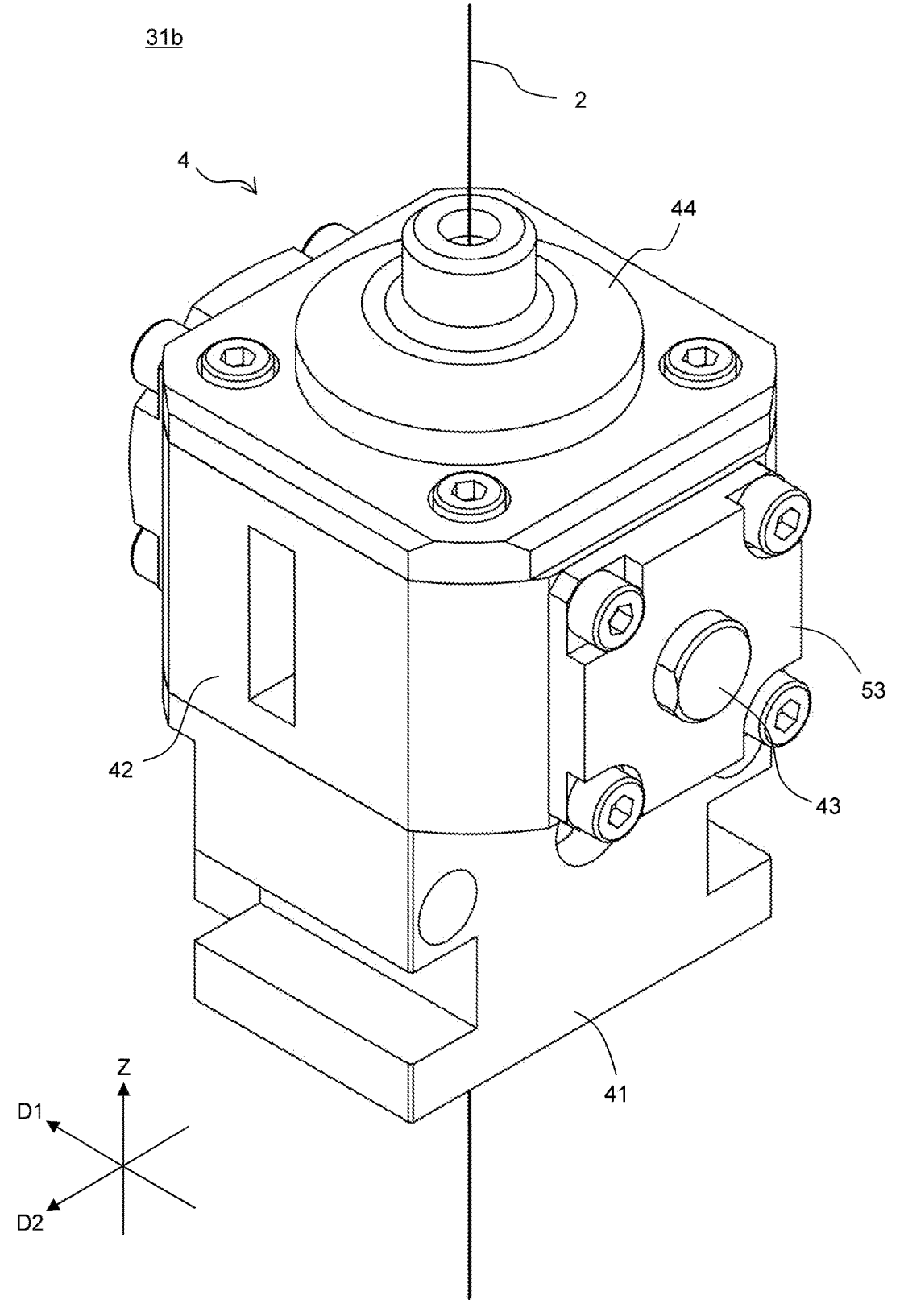
FIG. 3 is a perspective view illustrating the lower guide device 31b when viewed from the top in a different perspective.
Figure 4:
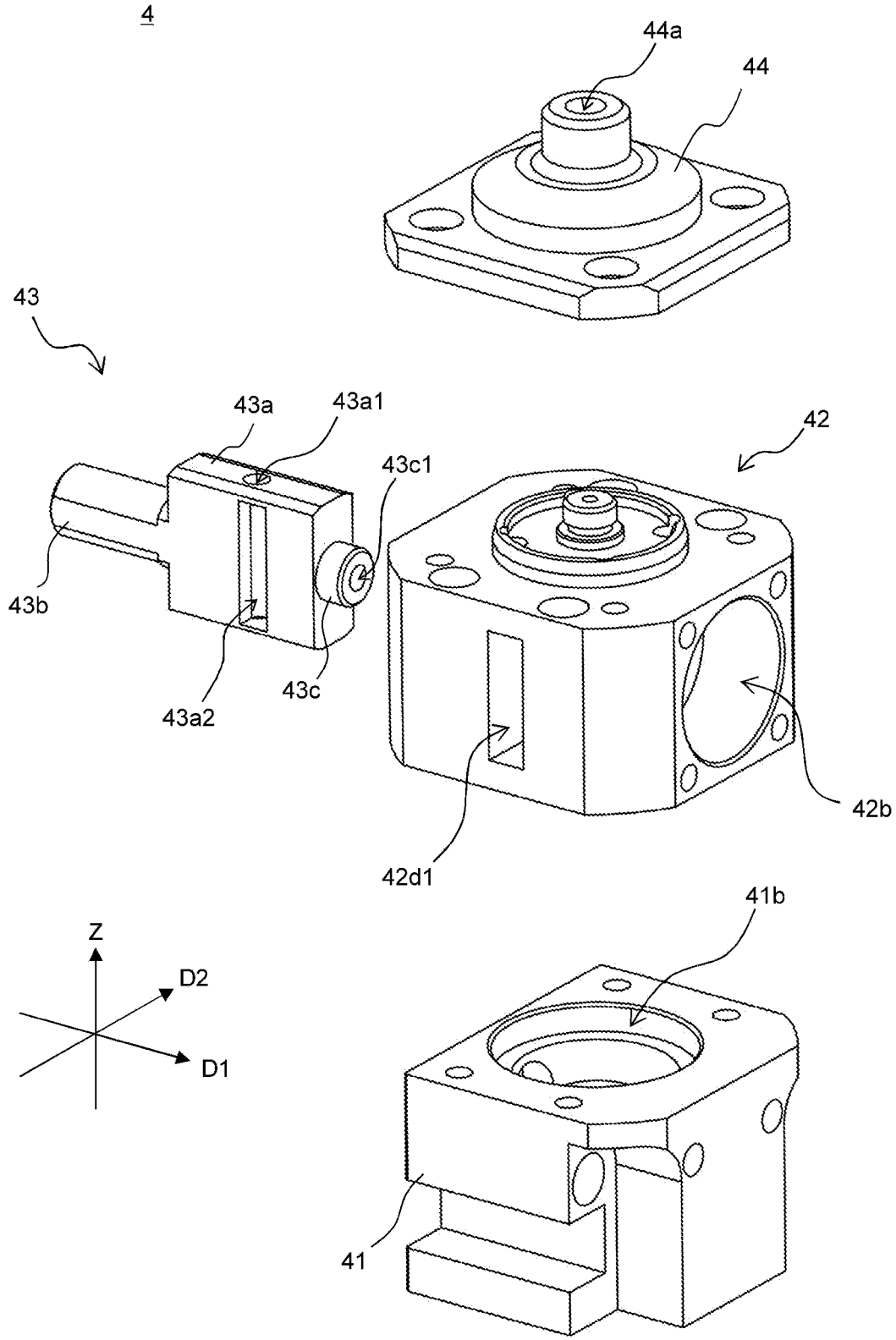
FIG. 4 is an exploded perspective view illustrating a housing 4 of the lower guide device 31b when viewed from the top.
Figure 5:
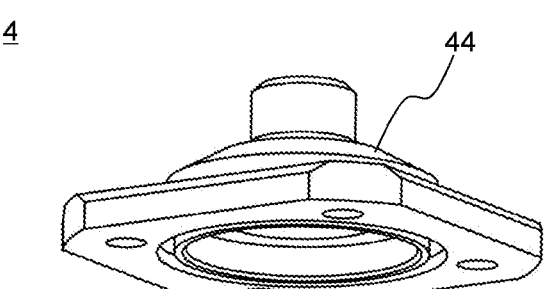
FIG. 5 is an exploded perspective view illustrating the housing 4 of the lower guide device 31b when viewed from the bottom.
Figure 5:
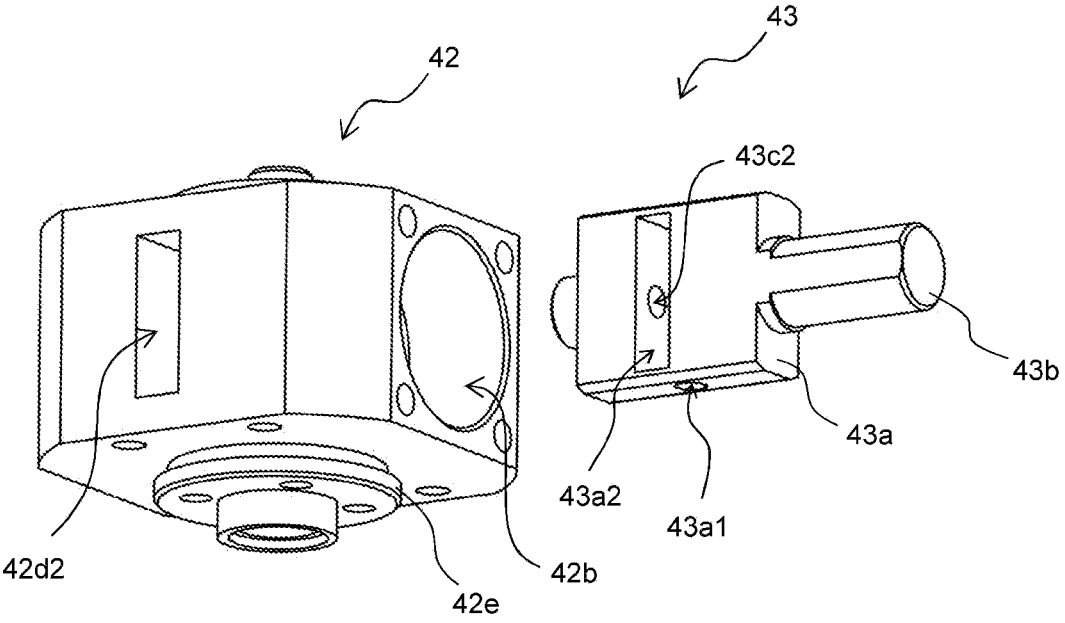
Figure 5:
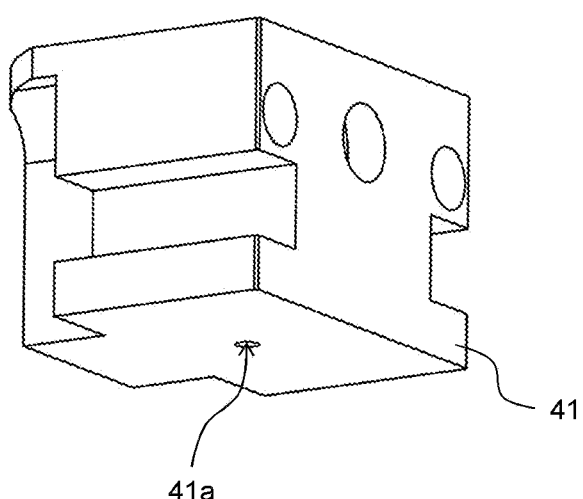

The invention provides a wire electric discharge machining apparatus capable of mechanically changing the contact state between the power conductor and the wire electrode.

The invention provides a wire electric discharge machining apparatus including a wire electrode, an upper guide device, and a lower guide device. The upper guide device and the lower guide device are respectively disposed on an upper side and a lower side of a workpiece to sandwich the workpiece along a vertical direction, and guide the wire electrode. The lower guide device includes a power conductor, and a fixing device fixing the power conductor at a predetermined position in the lower guide device. The power conductor moves in a first direction that is a horizontal axis direction and supplies power by contacting the wire electrode. The fixing device is configured to be switchable between a fixed state, in which a relative movement of the power conductor with respect to the lower guide device in a second direction that is another horizontal axis direction orthogonal to the first direction is not possible, and a non-fixed state in which the relative movement of the power conductor with respect to the lower guide device in the second direction is possible. The wire electric discharge machining apparatus includes: a pressing device, configured to be relatively movable with respect to the lower guide device and press the power conductor in the non-fixed state to move in the second direction; and a movement device, relatively moving the pressing device with respect to the lower guide device.

According to the wire electric discharge machining apparatus according to the invention, at least in the lower guide device, by using the fixing device fixing at a predetermined position in the lower guide device through reciprocally moving the lower power conductor in the first direction that is a horizontal axis direction and a direction in which the lower power conductor approaches or moves away from the wire electrode, it is possible to switch between the fixed state in which the relative movement of the lower power conductor with respect to the lower guide device is not possible and the non-fixed state in which the relative movement is possible. In addition, the pressing device presses the lower power conductor in the non-fixed state to move the lower power conductor in a second direction that is another horizontal axis direction orthogonal to the first direction. Accordingly, it is possible to move the lower power conductor without a manual operation of the operator to mechanically change the position of the lower power conductor contacting the wire electrode. In this way, in the process of changing the position of the lower power conductor, the burden of the operator can be alleviated, and the work time can be reduced.

In the following, various embodiments of the invention are exemplified. The following embodiments may be combined with each other.

According to an embodiment of the invention, the fixing device is configured to be able to reciprocally move the power conductor in the first direction.

According to an embodiment of the invention, the power conductor movement and fixing device includes a piston power cylinder and a biasing member. The biasing member is disposed to bias the power conductor in the first direction. In the fixed state, the piston power cylinder resists a biasing force of the biasing member to push the lower power conductor toward the wire electrode in the first direction and fix the lower power conductor. In the non-fixed state, the biasing member pushes the lower power conductor away from the wire electrode in the first direction.

According to an embodiment of the invention, the lower guide device includes a guide block. The guide block accommodates the power conductor in an accommodation space formed in the guide block. In the fixed state, the power cylinder pushes the power conductor to abut against a wall surface of the accommodation space and fixes the power conductor.

According to an embodiment of the invention, the pressing device includes: a body part linked to the movement device; and a pressing pin provided continuously from the body part, and protruding in a direction of the second direction from the body part so that a tip of the pressing pin is abuttable against the power conductor in the lower guide device.

According to an embodiment of the invention, the pressing pin is provided to be movable to a retracted position not interfering with the lower guide device during electric discharge machining of the workpiece.

According to an embodiment of the invention, in the pressing device, the pressing pin is set as a first pressing pin and the body part is set as a first body part. The pressing device further includes: a second body part linked to the movement device; and a second pressing pin, provided continuously from the second body part, and protruding in an other direction of the second direction from the second body part, so that a tip of the second pressing pin is abuttable against the power conductor in the lower guide device. The first pressing pin and the second pressing pin are disposed to sandwich the power conductor in the second direction.

According to an embodiment of the invention, the upper guide device includes a power conductor and a fixing device. The power conductor moves in a third direction that is a horizontal axis direction and supplies power by contacting the wire electrode. The fixing device is configured to be switchable between a fixed state, in which a relative movement of the power conductor with respect to the upper guide device in a fourth direction that is another horizontal axis direction orthogonal to the third direction is not possible, and a non-fixed state in which the relative movement of the power conductor with respect to the upper guide device in the fourth direction is possible. The power conductor is configured to be relatively movable with respect to the upper guide device. The wire electric discharge machining apparatus includes: a pressing device pressing the power conductor to move the power conductor in the fourth direction in the non-fixed state: and a movement device relatively moving the pressing device with respect to the upper guide device.

In the following, the embodiments of the invention will be described with reference to the drawings. The features shown in the following embodiments may be combined with each other. An invention is established independently for each feature.

1. Wire Electric Discharge Machining Apparatus

1.1. Overall Configuration

FIG. 1 is a schematic view illustrating a wire electric discharge machining apparatus 100 according to an embodiment of the invention. As shown in FIG. 1, the wire electric discharge machining apparatus 100 of the embodiment includes a wire electrode 2, an upper guide device 31a, and a lower guide device 31b. The upper guide device 31a and the lower guide device 31b are respectively disposed on the upper side and the lower side to sandwich a workpiece W in a vertical direction, and guide the wire electrode 2. The wire electrode 2 is inserted through a start hole formed in the workpiece W, and machining is performed by generating an electric discharge in a machining gap 10 formed between the wire electrode 2 and the workpiece W.

The wire electric discharge machining apparatus 100 includes a wire supply mechanism 1, an automatic wire threading device 17, a wire guide mechanism 3, and a wire collection mechanism 6 provided in order along the running path of the wire electrode 2. In addition, the wire electric discharge machining apparatus 100 includes a power supply device 91, a compressed air supply device 92, and a machining liquid supply device 93. In the following, along the running path of the wire electrode 2, a side relatively close to the wire supply mechanism 1 is defined as an upstream side, and a side relatively close to the wire collection mechanism 6 is defined as a downstream side. In addition, regarding the rotation direction of multiple rotation bodies, such as guide rollers, on the running path of the wire electrode 2 in the wire electric discharge machining apparatus 100, the rotation direction when the wire electrode 2 moves from the upstream side to the downstream side is defined as a forward rotation direction, and a rotation direction opposite to the forward rotation direction is defined as a reverse rotation direction.

1.2. Wire Supply Mechanism 1

The wire supply mechanism 1 is configured to consecutively supply a new wire electrode 2 along a predetermined running path, and mainly includes a reel 11, a brake device 13, a servo pulley 14, a tension application device 15, and a breakage detector 16. When a wire bobbin 12 installed to the reel 11 rotates in the forward rotation direction, the new wire electrode 2 is consecutively drawn out. The brake device 13 is, for example, a brake motor such as a hysteresis motor, or an electromagnetic brake such as an electromagnetic clutch. The brake device 13 stops the wire bobbin 12 from idling by applying a torque in the reverse rotation direction to the reel 11, and prevents the wire electrode 2 from loosening.

The servo pulley 14 is disposed to be freely movable in the vertical direction, and applies a predetermined load downward in the vertical direction to the wire electrode 2 by using its own weight. The servo pulley 14 moves in the vertical direction as the tension of the wire electrode 2 changes slightly, and absorbs slight vibration generated in the wire electrode 2. On the running path of the wire electrode 2 after passing the servo pulley 14, the breakage detector 16 detecting the breakage of the wire electrode 2 is disposed.

The tension application device 15 is configured to cooperate with the wire collection mechanism 6 to apply a predetermined tension to the wire electrode 2, and includes a feed roller 15a, a feed motor 15b, a tension detector 15c, and a pinch roller 15d. The feed roller 15a is driven by the feed motor 15b to rotate. The wire electrode 2 obtains a movement driving force by being pressed against the outer peripheral surface of the feed roller 15a by using the pinch roller 15d. In addition, the wire electrode 2 is moved along the outer peripheral surface of the feed roller 15a by using multiple rollers including the pinch roller 15d. The tension detector 15c is a strain gauge, for example, and is provided to detect the tension of the wire electrode 2. The feed motor 15b is a servo motor, and is under servo control based on the tension detection result obtained by the tension detector 15c. Accordingly, even in the case where the tension value is set to be small, the tension of the wire electrode 2 is stable, and the loosening and the breakage of the wire electrode 2 can be reliably avoided.

In the state in which the wire electrode 2 is guided by the upper guide device 31a and the lower guide device 31b, by adjusting the rotation speed difference between the feed roller 15a and a take-up roller 64a of the take-up device 64, the wire electrode 2 can be applied with a predetermined tension. In addition, at the time of threading the wire electrode 2, the feed roller 15a is rotated at a constant speed in the forward rotation direction, and the tip of the wire electrode 2 is inserted into and passes through the start hole to be captured by the wire collection mechanism 6. In addition, at the time of retrying the threading of the wire electrode 2, the feed roller 15a is rotated at a constant speed in the reverse rotation direction, and the wire electrode 2 is pulled up to a predetermined position.

1.3. Automatic Wire Threading Device 3

The automatic wire threading device 17 inserts the tip of the wire electrode 2 delivered from the wire supply mechanism 1 through the start hole formed in the workpiece W, and automatically stretches the wire electrode 2 between an upper wire guide 32a and a lower wire guide 32b respectively provided in the upper guide device 31a and the lower guide device 31b. The automatic wire threading device 17 includes a guide pipe 18 and a lifting device 19. The guide pipe 18 guides the wire electrode 2 from the upstream side to the upper wire guide 32a, so that the wire electrode 2 does not deviate from the predetermined running path. In FIG. 1, a state in which the guide pipe 18 is provided at an upper limit position is shown. The guide pipe 18 is configured to be movable in the vertical direction between the upper limit position and a lower limit position located immediately above the upper surface of the upper wire guide 32a by using the lifting device 19. At the time of annealing or cutting off the wire electrode 2, the lifting device 19 moves the guide pipe 18 to the upper limit position, and at the time when the tip of the wire electrode 2 is inserted into the start hole, the lifting device 19 moves the guide pipe 18 to the lower limit position.

In addition, as shown in FIG. 1, a wire vibration device 20 is provided immediately above the entrance of the guide pipe 18. The wire vibration device directly or indirectly applies a pressure to the wire electrode 2 along the running path by using compressed air supplied from the compressed air supply device 92. Accordingly, the wire electrode 2 is moved slightly in the upper-lower direction and easily passes through the start hole.

1.4. Wire Guide Mechanism 3

As shown in FIG. 1, the wire guide mechanism 3 includes the upper guide device 31a and the lower guide device 31b, and is configured to position and guide the wire electrode 2 on the predetermined running path in the vicinity of the workpiece W. The following description sets forth the details of the configuration of the lower guide device 31b as a specific example.

As shown in FIG. 1, the lower guide device 31b of the embodiment is formed by assembling components such as the lower wire guide 32*b*, a lower power conductor 33*b*, a lower opening/closing device of the lower power conductor 33*b*, and a lower fixing device of the lower power conductor 33*b*, etc., in the housing 4. The wire electrode 2 is conducted through the lower guide device 31*b* disposed on the lower side of the workpiece W, and is guided to the wire collection mechanism 6. In the following description, a vertical direction Z, a first direction D1, and a second direction D2 are as shown in FIG. 1. The first direction D1 is a horizontal axis direction, and is a movement direction when the lower power conductor 33*b* contacts or moves away from the wire electrode 2. The second direction D2 is another horizontal axis direction orthogonal to the first direction.

The lower opening/closing device is a means with which the lower power conductor 33*b* contacts or moves away from the wire electrode 33*b* by reciprocally moving the lower power conductor 33*b* in the first direction D1. In the invention, a predetermined position set in advance so that the lower power conductor 33*b* contacts the wire electrode 2 is defined as a machining position, and the lower power conductor 33*b* is referred to as being in a closed state. Meanwhile, a predetermined position at which the lower power conductor 33*b* is apart to not contact the wire electrode 2 is defined as a retracted position, and the lower power conductor 33*b* is referred to as being in an open state. During machining, the lower opening/closing device moves the lower power conductor 33*b* to a machining position to bring the lower power conductor 33*b* into contact with the wire electrode 2, and, for example, moves the lower power conductor 33*b* to the retracted position at the time of automatic threading or at the time of replacing the lower power conductor 33*b*. The lower fixing device is a means with which the lower power conductor 33*b* is fixed at a predetermined position in the lower guide device by reciprocally moving the lower power conductor 33*b* in the first direction D1. The lower fixing device is configured to be switchable between a fixed state in which a relative movement of the lower power conductor 33*b* with respect to the lower guide device 31*b* in the second direction D2 is not possible and a non-fixed state in which the relative movement of the lower power conductor with respect to the lower guide device in the second direction D2 is possible. In the lower guide device 31*b* of the embodiment, the opening/closing device and the fixing device are substantially formed by the same components, that is, the fixing device also serves as the opening/closing device, so that the lower power conductor 33*b* is moved to the predetermined machining position to be closed and fixed at the same time, and the lower power conductor 33*b* is moved to the predetermined retracted position to be opened and released from fixture at the same time.

As shown in FIGS. 2 to 6, the housing 4 includes a base 41, a guide block 42, a slide block 43, and a jet nozzle 44. It is noted that although some portions are omitted in FIGS. 2 to 6 under the consideration of visibility, a sealing member, such as an O-ring, a washer, etc., may be interposed as appropriate between the components forming the housing 4 to facilitate sealing performance.

The base 41 is fixed to a tip of a lower arm not shown herein. The base 41 is a component in which the lower guide device 31*b* is installed to the lower arm to support the lower guide device 31*b* with the lower arm. The base 41 is disposed on the lower side of the housing 4, which is the main body of the lower guide device 31*b*, and an electrode insertion hole 41*a* through which the wire electrode 2 is inserted is formed in the vicinity of the center of the base 41 along a vertical direction Z. A concave part 41*b* for receiving the guide block 42 is formed on the upper surface of the base 41.

Figure 7:
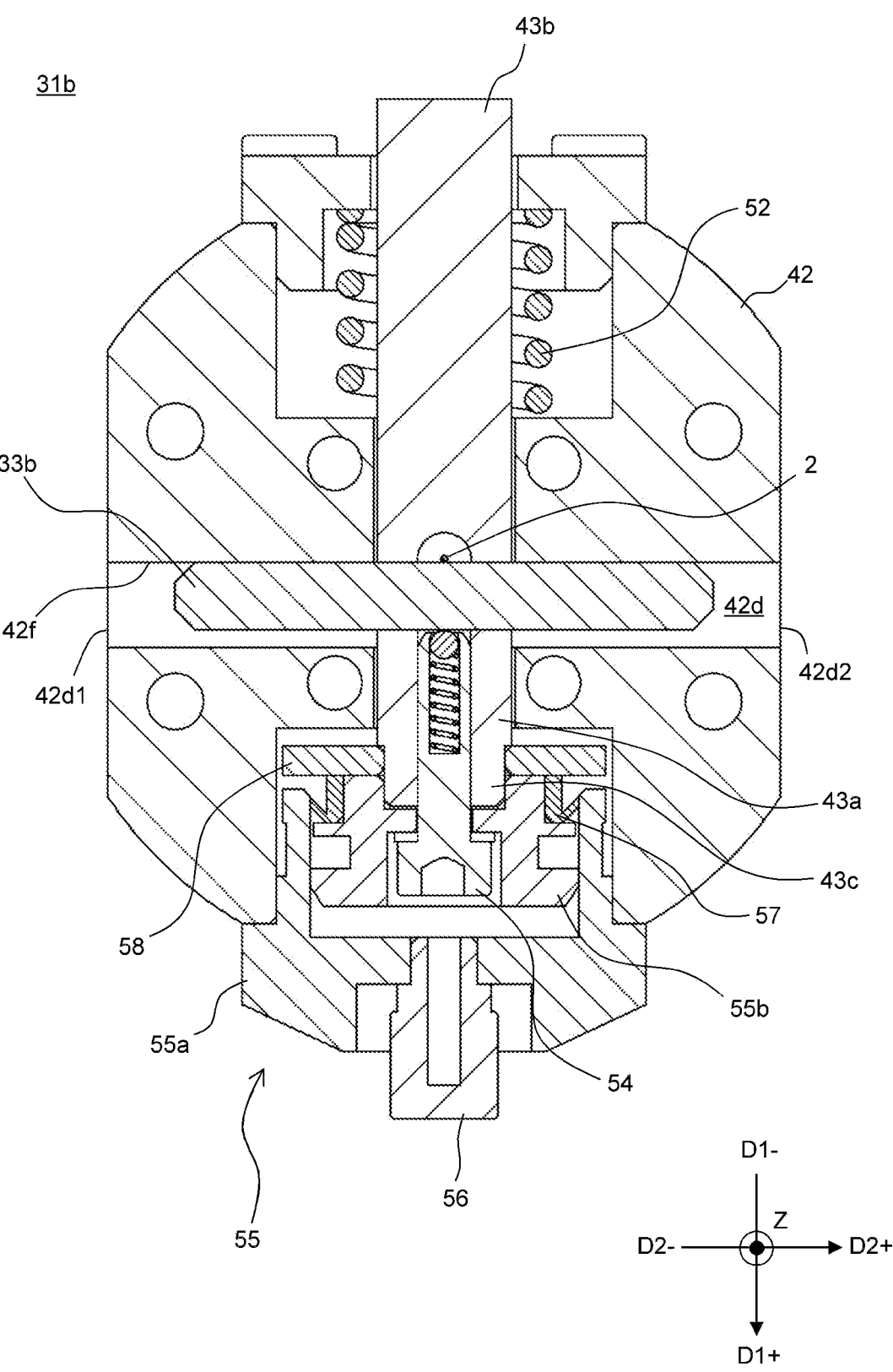
FIG. 7 is a cross-sectional view taken along B-B in FIG. 2 when the lower power conductor 33b is in a fixed state.
Figure 8:
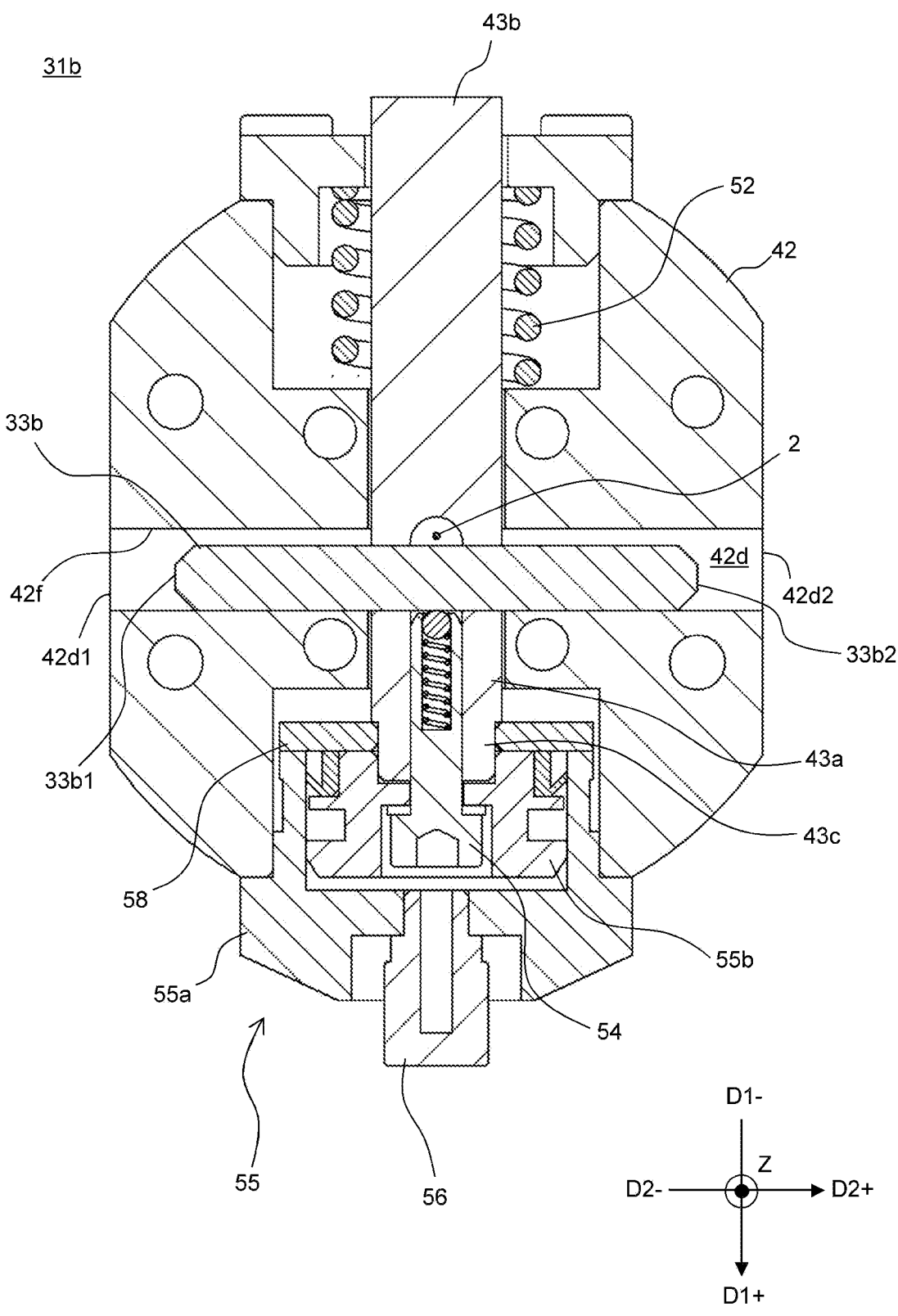
FIG. 8 is a cross-sectional view taken along B-B in FIG. 2 when the lower power conductor 33b is in a non-fixed state.

The guide block 42 is disposed to the top of the base 41, and a protrusion 42*e* in a substantially cylindrical shape protruding from the lower surface is fit into the concave part 41*b* of the base 41. In the guide block 42, an electrode insertion hole 42*a* through which the wire electrode is inserted is formed along the vertical direction Z. In addition, a through hole 42*b* is formed along the first direction D1, and the slide block 43 is inserted into the through hole 42*b*. In addition, an accommodation space 42*d* is formed inside the guide block 42, so as to penetrate through the guide block 42 along the second direction D2, as shown in FIGS. 7 and 8, and the lower power conductor 33*b* in a plate shape is inserted from any of opening parts 42*d*1, 42*d*2 on the two ends of the accommodation space 42*d* to be accommodated in the accommodation space 42*d*. The lower wire guide 32*b* is disposed at the upper part of the guide block 42. The lower wire guide 32*b* of the embodiment is a die guide. The lower wire guide 32*b* includes a guide hole 32*b*1, and the wire guide electrode 2 is guided in the vertical direction Z by being inserted through the lower wire guide 32*b* in a state in which a clearance of several μm is provided with respect to the inner surface of the guide hole 32*b*1. In addition, an exit guide 51, which is a die guide for guiding the wire electrode 2 from the guide block 42 to the electrode insertion hole 41*a* of the base 41 is disposed at the lower part of the guide block 42.

The slide block 43 includes a plate part 43*a* in a substantially rectangular parallelepiped shape, a shaft 43*b* in a substantially cylindrically columnar shape provided on one of a pair of opposite end surfaces of the plate part 43*a*, and a cylindrical part 43*c* in a cylindrical shape provided on the other end surface. In the plate part 43*a*, an electrode insertion hole 43*a*1 for insertion of the wire electrode 2 is formed along the vertical direction Z, and a through hole 43*a*2 in a slot shape for insertion of the lower power conductor 33*b* is formed along the second direction D2. The width of the through hole 43*a*2 in the first direction D1 is set to be substantially the same as the thickness of the lower power conductor 33*b* in the first direction D1 after the clearance to an extent that the lower power conductor 33*b* is able to be inserted is provided. In addition, the through hole 43*a*2 is formed so as to be continuous with the accommodation space 42*d* of the guide block 42. The lower power conductor 33*b* inserted from the opening part 42*d*1, 42*d*2 of the guide block 42 is inserted through the through hole 43*a*2 and accommodated in the accommodation space 42*d* in a state of traversing the plate part 43*a*. In addition, the through hole 43*a*2 and the electrode insertion hole 43*a*1 are formed so that the spaces occupied by the through hole 43*a*2 and the electrode insertion hole 43*a*1 are partially overlapped. Accordingly, in the overlapped space, the lower power conductor 33*b* inserted through the through hole 43*a*2 is able to contact the wire electrode 2 inserted through the electrode through hole 43*a*1.

A biasing member 52 is wound on the shaft 43*b*, and an end of the biasing member 52 abuts against a cover member 53. The slide block 43 is biased in the first direction D1 by the biasing member 52. The biasing member 52 of the embodiment is a compression spring. Specifically, the slide block 43 is biased toward D1+ in FIG. 6 along the first direction D1 shown in FIG. 6.

An opening part 43*c*1 is formed on the end surface of the cylindrical part 43*c*. Inside the cylindrical part 43*c*, an insertion hole 43*c*2 connecting the opening part 43*c*1 and a through hole 43*a*2 of the plate part 43*a* is formed. A plunger bolt 54 is inserted into the insertion hole 43*c*2. A ball 54*a* at the tip of the plunger bolt 54 abuts against the lower power conductor 33*b*, and constantly presses the lower power conductor 33*b* toward D1− along the first direction D1 by using a relatively small biasing force of a spring 54*b* inside.

Figure 6:
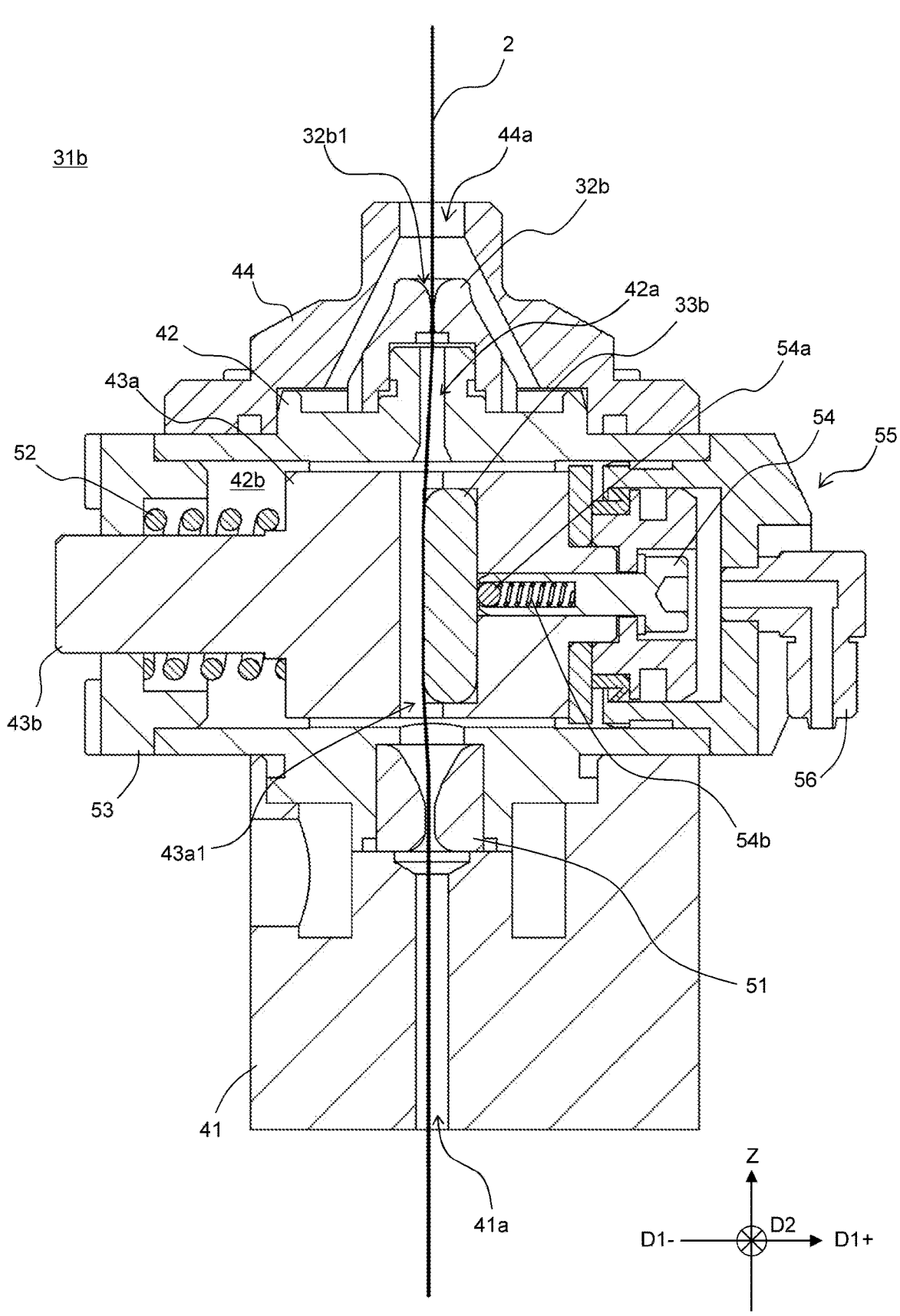
FIG. 6 is a cross-sectional view taken along A-A in FIG. 2 when the lower power conductor 33b is in a fixed state.

As shown in FIGS. 6 to 8, a power cylinder 55 is installed to the cylindrical part 43*c*. The power cylinder 55 includes a cylinder 55*a* and a piston 55*b* slidable inside the cylinder 55*a*. The piston 55*b* is fit to the cylindrical part 43*c* of the slide block 43 in a state in which the plunger bolt 54 penetrates through the vicinity of the center. The power cylinder 55 of the embodiment is an air cylinder, and the piston 55*b* moves reciprocally in the first direction D1 by using a pressure of the compressed air supplied via a connection tube 56. In order to prevent a foreign matter from being mixed into the cylinder 55*a*, a scraper 57 may also be mounted to the side surface of the cylinder 55*a*. In the embodiment, a metal plate 58 is disposed on the end surface of the piston 55*b*. When the piston 55*b* moves a predetermined distance toward D1+, the plate 58 shown in FIG. 8 abuts against the cylinder 55*a*. Accordingly, further movement of the piston 55*b* is limited.

The jet nozzle 44 is provided to inject a pressurized machining liquid supplied from the machining liquid supply device 93 to the machining gap 10. In the jet nozzle 44, an electrode insertion hole 44*a* for insertion of the wire electrode is formed. The electrode insertion holes 41*a*, 42*a*, 43*a*1, and 44*a* of the base 41, the guide block 42, the slide block 43, and the jet nozzle 44 are provided continuously in the vertical direction Z. Accordingly, the running path of the wire electrode 2 in the housing 4 is formed.

The upper guide device 31*a* can be formed by using components substantially the same as the lower guide device 31*b*, except for the base 41. Therefore, detailed description thereof will be omitted. Specifically, the upper fixing device of the upper guide device 31*a* can be configured in the same way as the lower fixing device of the lower guide device 31*b*. In addition, the wire electric discharge machining apparatus 100 includes a so-called taper device (not shown) that relatively moves, in the horizontal direction, one of the upper guide device 31*a* and the lower guide device 31*b* with respect to the other. Through the relative movement, the wire electrode 2 can be tilted with respect to the workpiece W to perform machining.

The upper power conductor 33*a* and the lower power conductor 33*b* accommodated in the upper guide device 31*a* and the lower guide device 31*b* are movable along the first direction D1. Power supply is carried out by moving the upper power conductor 33*a* and the lower power conductor 33*b* toward D1− to contact the wire electrode 2, and power supply is stopped by moving, from the contacted state, the upper power conductor 33*a* and the lower power conductor 33*b* toward D1+ to be separated from the wire electrode 2. In the embodiment, the power cylinder 55 and the biasing member 52 in the lower guide device 31*b* form the lower fixing device and move the lower power conductor 33*b* reciprocally along the first direction D1. The power supply device 91 supplies power to the wire electrode 2 and the workpiece W, and includes a DC power source, a switching element, and a discharge machining circuit (not shown) including a diode that prevents current backflow. In general, the upper power conductor 33*a* and the lower power conductor 33*b* are connected to the negative electrode of the DC power source of the power supply device 91. In addition, the positive electrode of the DC power source is connected to the workpiece W. By moving the upper power conductor 33*a* and the lower power conductor 33*b* in the first direction D1 to contact the wire electrode 2, the power supply device 91 repetitively applies a voltage pulse to the machining gap 10 between the wire electrode 2 and the workpiece W through the upper power conductor 33*a*, the lower power conductor 33*b*, and the workpiece W, and an electric discharge is generated. The greater the extent to which the upper power conductor 33*a* and the lower power conductor 33*b* contact the wire electrode 2, the smaller the contact resistance at the contact position and the greater the amount of supplied power.

1.5. Wire Collection Mechanism 6

The wire collection mechanism 6 collects the wire electrode 2 supplied and consumed for machining from the machining gap 10. The wire collection mechanism 6 includes a direction changing roller 61, a conveying pipe 62, an aspirator 63, the take-up device 64, a wire cutter 65, and a bucket 66. The movement direction of the wire electrode 2 having passed the lower wire guide device 31*b* is changed to the horizontal direction by the direction changing roller 61, and the wire electrode 2 is inserted into the conveying pipe 62. The wire electrode 2 in the conveying pipe 62 is attracted by the aspirator 63 and receives a pushing power.

The take-up device 64 includes the take-up roller 64*a*, a pinch roller 64*b*, and a take-up motor 64*c*. The wire electrode 2 having passed the conveying pipe 62 is sandwiched between the take-up roller 64*a* and the pinch roller 64*b* of the take-up device 64. The take-up roller 64*a* is rotated at a predetermined rotation speed in the forward rotation direction by using the take-up motor 64*c* which is a constant-speed rotation motor, and draws the wire electrode 2 to immediate above the bucket 66 while moving. The wire electrode 2 that is drawn is shredded by the wire cutter 65 as appropriate and accommodated in the bucket 66.

1.6. Pressing Device 8

Figure 9:
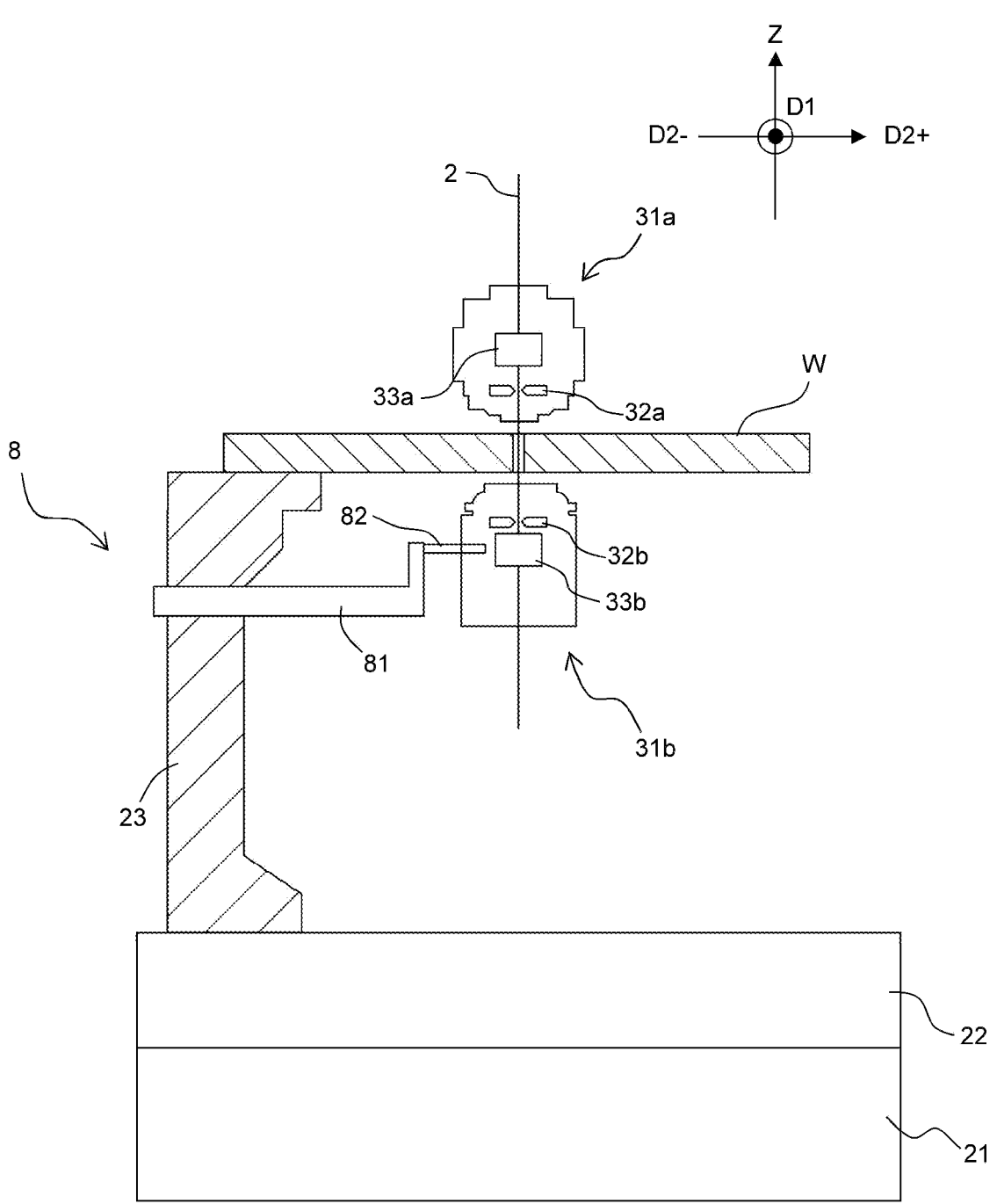
FIG. 9 is a schematic view illustrating a configuration of a pressing device 8.

The wire electric discharge machining apparatus 100 includes the pressing device 8. The pressing device 8 is configured to be relatively movable with respect to the lower guide device 31*b*, and is configured to press the lower power conductor 33*b* in the lower guide device 31*b* to move in the second direction D2. As shown in FIG. 9, the pressing device 8 of the embodiment is provided by being installed to a mechanism fixing the workpiece W. The wire electric discharge machining apparatus 100 includes a bed 21 that is a base horizontally disposed on the floor, a table 22 mounted on the bed 21, and a work stand 23 provided on the table 22. The workpiece W is fixed to the upper surface of the work stand 23. By simultaneously moving relatively the upper guide device 31*a* and the lower guide device 31*b* and the work stand 23 in two horizontal axis directions orthogonal to each other to relatively move the wire electrode 2 and the workpiece W, a machining position on the upper or lower surface of the workpiece W can be arbitrarily adjusted.

The pressing device 8 includes a body part 81 linked to the work stand 23 and a first pressing pin 82 provided continuously from the body part 81 and protruding in a direction of the second direction D2 (D2+ in FIG. 9). The first pressing pin 82 is inserted into the accommodation space 42*d* from the opening part 42*d*1 of the guide block 42 of the lower guide device 31*b*, and the lower power conductor 33*b* can be moved toward D2+ in the second direction D2 by pressing the end surface 33*b*1 of the lower power conductor 33*b* with the tip of the first pressing pin 82.

Figure 10:
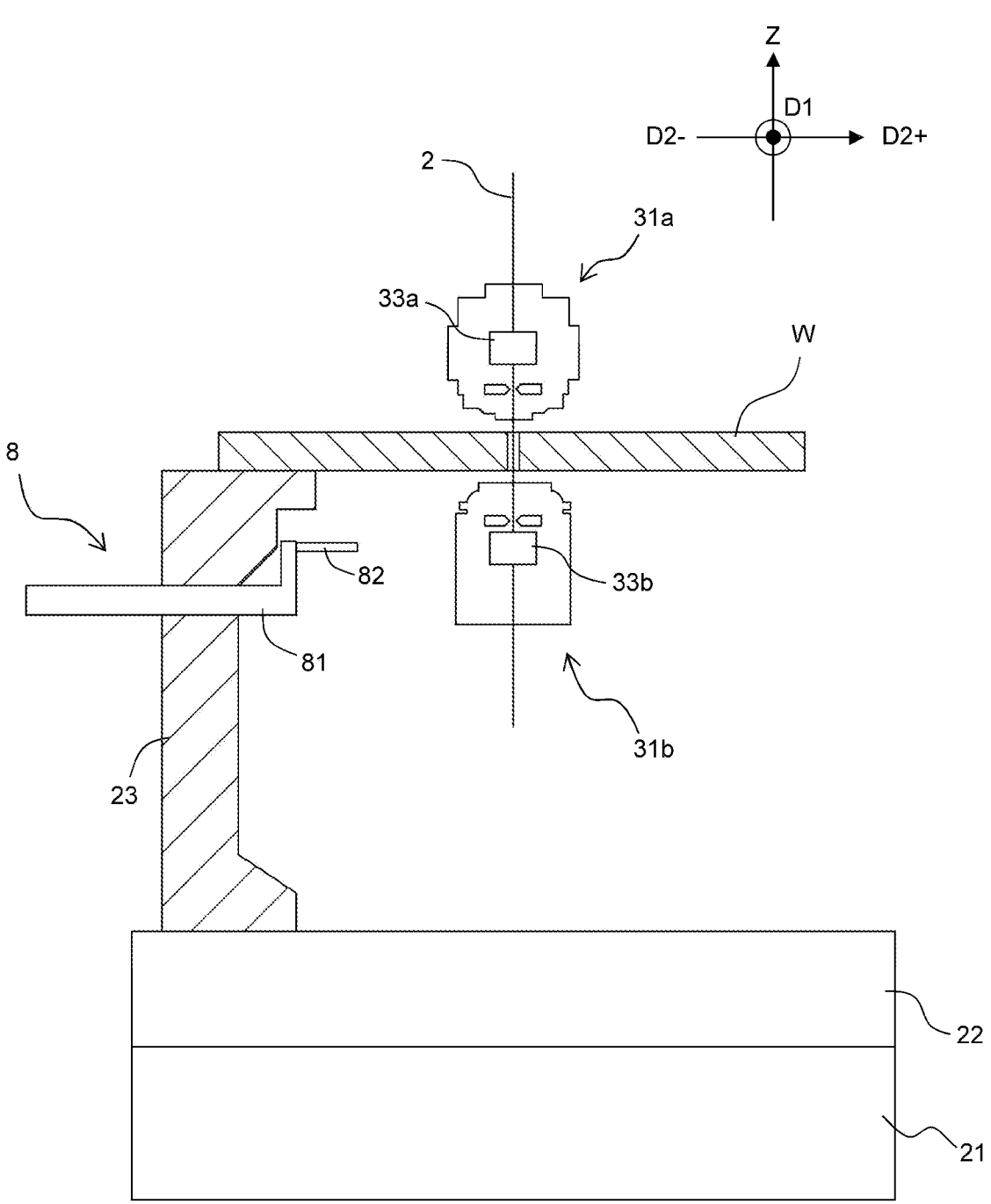
FIG. 10 is a schematic view illustrating a state in which a first pressing pin 82 is in a retracted position.

Since the work stand 23 of the embodiment is relatively movable in the two horizontal axis directions, a means for moving the work stand 23 in a horizontal axis direction with respect to the lower guide device 31*b*, that is, D2+ of the second direction D2 in the embodiment shown in FIG. 9, is used as a movement device. With the movement device, it is possible to move the pressing device 8 linked and fixed to the work stand 23 toward D2+ in the second direction D2 with respect to the lower guide device 31b. In addition, the body part 81 is configured to be slidable along the second direction D2 with respect to the work stand 23. The pressing of the lower power conductor 33b is performed when the electric discharge machining of the workpiece W is not performed. In the electric discharge machining of the workpiece W, the body part 81 is able to slide or stretch/contract with respect to the work stand 23, and, as shown in FIG. 10, move the first pressing pin 82 to a retracted position not interfering with the lower guide device 31b. As examples, a linear motor mechanism, a rack and pinion mechanism, a fluid pressure cylinder, or an electric cylinder can be used as the driving mechanism sliding the body part 81.

However, the movement device is not limited to the above configurations. For example, it may also be that a movement device horizontally moving the lower guide device 31b is used to move the lower guide device 31b with respect to the pressing device 8. Also, for example, the relative movement of the pressing device 8 may also be realized by, for example, combining the movement of the pressing device 8 resulting from the work stand 23 together with the movement of the table 22 and the movement of the lower guide device 31b resulting from the movement of a column to which a lower arm not shown herein is fixed.

Moreover, the pressing device 8 may also be configured to press and move the upper power conductor 33a in the upper guide device 31a in addition to the lower power conductor 33b. For example, by additionally providing a pressing pin above the workpiece W and moving relatively with respect to the upper guide device 31a, the pressing device 8 can press and move the upper power conductor 33a accommodated in the upper guide device 31a with the tip of the pressing pin.

2. Movement and Fixing of the Power Conductor

In the following, the movement and fixing of the power conductor is described in detail. In the following description, the movement and fixing of the lower power conductor 33b is described in detail as a specific example.

The lower power conductor 33b inserted from the opening part of the guide block 42 and accommodated in the accommodation space 42d is switched, by the lower fixing device, between a fixed state in which a relative movement with respect to the lower guide device 31b in the second direction D2 is not possible and a non-fixed state in which a relative movement with respect to the lower guide device 31b in the second direction D2 is possible. In the embodiment, the power cylinder 55 and the biasing member 52 in the lower guide device 31b form the lower fixing device.

FIGS. 6 and 7 illustrate the lower power conductor 33b in the fixed state. The slide block 43 is biased by the biasing member 52 toward D1+ along the first direction D1. Accordingly, the lower power conductor 33b inserted into the through hole 43a2 of the slide block 43 is biased away from the wire electrode from the predetermined machining position to the retracted position in the first direction D1. When compressed air is supplied to the power cylinder 55, the piston 55b moves in the cylinder 55a and resists the biasing force of the biasing member 52 to move the slide block 43 toward D1− along the first direction D1. Together with this, the lower power conductor 33b is pushed out along the first direction D1 from the predetermined retracted position toward the wire electrode 2 and fixed at the predetermined machining position. In the embodiment, by pushing out the lower power conductor 33b to abut against a wall surface 42f of the accommodation space 42d on the side of the wire electrode 2, the lower power conductor 33b can be fixed with respect to the lower guide device 31b. The fixed lower power conductor 33b is in contact with the wire electrode 2 and supplies power to the wire electrode 2 accordingly.

FIG. 8 illustrates the lower power conductor 33b in the non-fixed state. When the supply of the compressed air to the power cylinder 55 stops, the force of the piston 55b pushing the slide block 43 is reduced, the slide block 43 moves toward D1+ by using the biasing force of the biasing member 52, and the lower power conductor 33b is pushed away from the wire electrode 2 along the first direction D1 from the predetermined machining position to the retracted position. In the embodiment, the lower power conductor 33b is relieved from fixture by being pushed to be separated from the wall surface 42f of the accommodation space 42d on the side of the wire electrode 2, and the lower power conductor 33b becomes movable along the second direction D2 in the accommodation space 42d. The lower power conductor 33b in the non-fixed state is in a state of not contacting the wire electrode 2.

When the lower power conductor 33b is moved, the pressing device 8 approaches the lower guide device 31b through the horizontal movement of the work stand 23 as the movement device. Then, the first pressing pin 82 is inserted into the accommodation space 42d from the opening part 42d1 of the guide block 42, and the end surface 33b1 of the lower power conductor 33b is pressed with the tip of the first pressing pin 82. Accordingly, the lower power conductor 33b is moved toward D2+ along the second direction D2 in the accommodation space 42d.

As described above, the lower power conductor 33b is constantly pressed by the plunger bolt 54 toward D1− along the first direction D1. The biasing force of the spring 54b of the plunger bolt 54 is set to be small to an extent that the biasing force does not obstruct the movement of the lower power conductor 33b of the non-fixed state in the second direction D2 by the first pressing pin 82. Accordingly, even in the non-fixed state, the lower power conductor 33b is pushed to the wall surface of the through hole 43a2 of the slide block 43, and an excessive movement along the second direction due to pressing of the first pressing pin 82 can be suppressed.

The movement amount of the lower power conductor 33b can be adjusted by increasing or reducing the pressing amount of the first pressing pin 82. The pitch (the movement distance along the second direction D2 in one movement) of the movement of the lower power conductor 33b can be set as appropriate according to the outer diameter of the wire electrode 2 or the machining condition, such as being 0.3 mm or more and 2 mm or less.

The movement of the lower power conductor 33b can be carried out before the electric discharge machining starts or in the middle of the electric discharge machining. In the latter case, for example, the movement of the lower power conductor 33b may be carried out when the machining is interrupted in order to thread the wire electrode 2 again. In the discharge machining, in order to change the machining position of the workpiece W, the wire electrode 2 is frequently cut off and threaded during the electric discharge machining. If the lower power conductor 33b is moved when the wire electrode 2 is cut under such circumstance, it is not necessary to interrupt the machining only to move the lower power conductor 33b.

In the upper power conductor 33*a* as well, it is possible to switch the upper power conductor 33*a* between the fixed state and the non-fixed state by using an upper movement device (not shown) having the same mechanism, and the upper power conductor 33*a* can be moved in the upper guide device 31*a* by using the pressing device 8.

By using the pressing device 8, the lower power conductor 33*b* can be automatically moved in the accommodation space 42*d* inside the lower guide device 31*b*. In the case where the size of the workpiece W is large and it is difficult for the hand of the operator to reach the lower guide device 31*b*, or in the case where the lower guide device 31*b* is disposed in the machining liquid to immerse and machine the workpiece W in a machining liquid as well, it is not necessary to perform a process that interrupts the machining, such as moving the workpiece W or discharging the machining liquid, etc., for a long period of time. Since it is possible to frequently change the contact state between the lower power conductor 33*b* and the wire electrode 2, it is possible to avoid the situation where the processing accuracy is reduced through continued machining beyond the usage limit of the lower power conductor 33*b*.

In addition, by automatically changing the position of the lower power conductor 33*b*, it is not required to manually position and fix the lower power conductor 33*b*, and the machining efficiency can be facilitated. Moreover, the pitch of the movement of the lower power conductor 33*b* can be set finely and adjusted freely in accordance with the machining condition, and the service time of the lower power conductor 33*b* can be increased.

Furthermore, the table 22 moving the work stand 23 or a readily available mechanism for moving the guide device can be used as the movement device for moving the pressing device 8 relatively with respect to the lower guide device 31*b*. It is not necessary to provide a new driving mechanism for moving the pressing device 8, and the arrangement is easy.

3. Control Device 7

Figure 11:
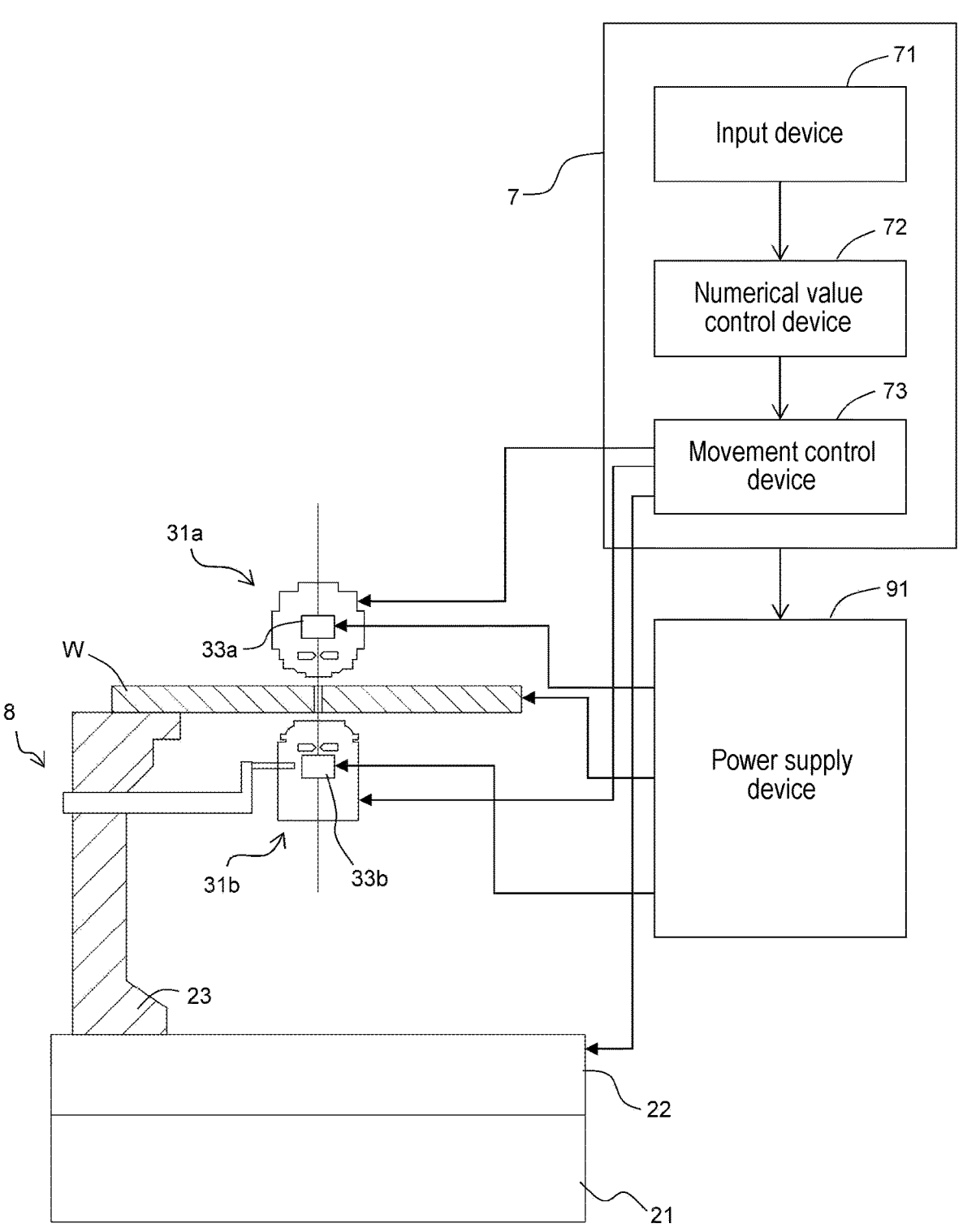
FIG. 11 is a block diagram illustrating a configuration of a control device 7.

In the following, the control device 7 for controlling the operation of the wire electric discharge machining apparatus 100 is described. The control device 7 controls the operations of the entire wire electric discharge machining apparatus 100 as well as the operation of each forming device. In the following, only the control relating to the embodiments of the invention, among the control operations of the control device 7, is described. As shown in FIG. 11, the control device 7 includes an input device 71, a numerical control device 72, and a movement control device 73.

Each of the forming components of the control device 7 may be realized by software or hardware. When realized by software, various functions can be realized by executing computer programs with a CPU. The program may be stored in a built-in memory or a non-transitory recording medium readable by a computer. In addition, the above functions are realized by reading the program stored in an external memory using so-called cloud computing. When realized by hardware, the above functions can be realized by various circuits such as an application-specific integrated circuit (ASIC), a field-programmable gate array (FPGA), or a dynamically reconfigurable processor (DRP). The embodiment deals with various information or concepts including this information, and the various information is a bit group of binary numbers having 0 or 1, and the various information is represented according to the level of signal value. In the embodiment, communications and calculations may be executed according to configurations of the above software and hardware.

The input device 71 is provided for an operator to input necessary information for various processes in the numerical control device 72, and can be formed by, for example, a touch panel, a keyboard, or a mouse. Examples as input information include the movement pitches, time intervals, etc., of the upper power conductor 33*a* and the lower power conductor 33*b*. The input information is output to the numerical control device 72.

The numerical control device 72 uses an NC program in which data relating to the input information and the machining condition are recorded and generates an operation command to the wire electric discharge machining apparatus 100. The numerical control device 72 sets a machining condition suitable for the desired electric discharge machining by reading the machining condition recorded in the NC program, or based on the input information to the input device 72. The machining conditions that are set are output in the form of a signal of the operation command or data of an operation command value to the control part of each device and mechanism forming the wire electric discharge machining apparatus 100.

The movement control device 73 controls the upper fixing device and the lower fixing device in accordance with the operation command. For the lower fixing device, the supply of compressed air to the power cylinder 55 is controlled to switch between the fixed state and the non-fixed state of the lower power conductor 33*b*. In addition, the movement control device 73 controls the pressing device 8 and the movement device. For example, in the case where the table 22 or the movement mechanism of the guide device is used as the movement device of the pressing device 8, the table 22 or the movement mechanism of the guide device are operated to move the pressing device 8 relatively with respect to the lower guide device 31*b*. In addition, in the case where a driving mechanism for sliding and moving the body part 81 is provided in the pressing device 8, the movement control device 73 controls the driving mechanism, and moves the pressing device 8 to approach the lower guide device 31*b* or to the retracted position.

In addition, the control device 7 outputs the operation command to the control part of each device and mechanism forming the wire electric discharge machining apparatus 100, and receives feedbacks of actual operation information of each device and mechanism from each control part.

4. Wire Electric Discharge Machining Method of Workpiece W

In the following, a wire electric discharge machining method of the workpiece W using the wire electric discharge machining apparatus 100 according to the embodiment is described with a focus on the procedures relating to the lower power conductor 33*b*.

Firstly, the operator inserts an unused lower power conductor 33*b* from any of the opening parts 42*d*1 and 42*d*2 of the guide block 42. The operator inputs information, such as the movement pitch, time interval of the lower power conductor 33*b* to the input device 71 of the control device 7. Then, the position of the lower power conductor 33*b* is initialized. The lower power conductor 33*b* is set to the non-fixed state, and by pressing the lower power conductor 33*b* by using the first pressing pin 82 while relatively moving the pressing device 8 with respect to the lower guide device 31*b*, the lower power conductor 33*b* is moved along the second direction D2 to an initial position in the accommodation space 42*d*.

The power cylinder 55 is supplied with compressed air, and the lower power conductor 33*b* is set to the fixed state to contact the wire electrode 2. In addition, the power supply device 91 operates in accordance with the operation command, and repetitively applies a voltage pulse to the machining gap 10 between the wire electrode 2 and the workpiece W through the upper power conductor 33*a* and the lower power conductor 33*b*. Accordingly, an electric discharge is generated in the machining gap 10, and the machining for a required shape is performed.

After the predetermined machining time has passed, the lower power conductor 33*b* is moved at a timing when the machining is interrupted to change the machining position, etc. Specifically, the supply of the compressed air to the power cylinder 55 is stopped, and the lower power conductor 33*b* is set to the non-fixed state. The work stand 23 is moved relatively in a horizontal axis direction and the pressing device 8 approaches the lower guide device 31*b* to insert the first pressing pin 82 into the accommodation space 42*d*, and the lower power conductor 33*b* is pressed by the first pressing pin 82 to move along the second direction D2 by a predetermined pitch.

After the movement is completed, the first pressing pin 82 is extracted from the accommodation space 42*d* and moved to the retracted position. After threading of the wire electrode 2, the power cylinder 55 is supplied with compressed air, and the lower power conductor 33*b* is set to the fixed state. An unused portion of the lower power conductor 33*b* contacts the wire electrode 2. In such state, the machining starts again.

The above processes are repeated until a usage region in which a single surface of the lower power conductor 33*b* is determined along the second direction D2 has been completely used. After the single surface is used up, the lower power conductor 33*b* is manually extracted, and the lower power conductor 33*b* is inserted again so that the surface opposite to the used single surface contacts the wire electrode 2. After both surfaces of the lower power conductor 33*b* are used up, the lower power conductor 33*b* is replaced with an unused lower power conductor 33*b*.

5. Other Embodiments

The invention may also be implemented in modes as follows.

Figure 12:
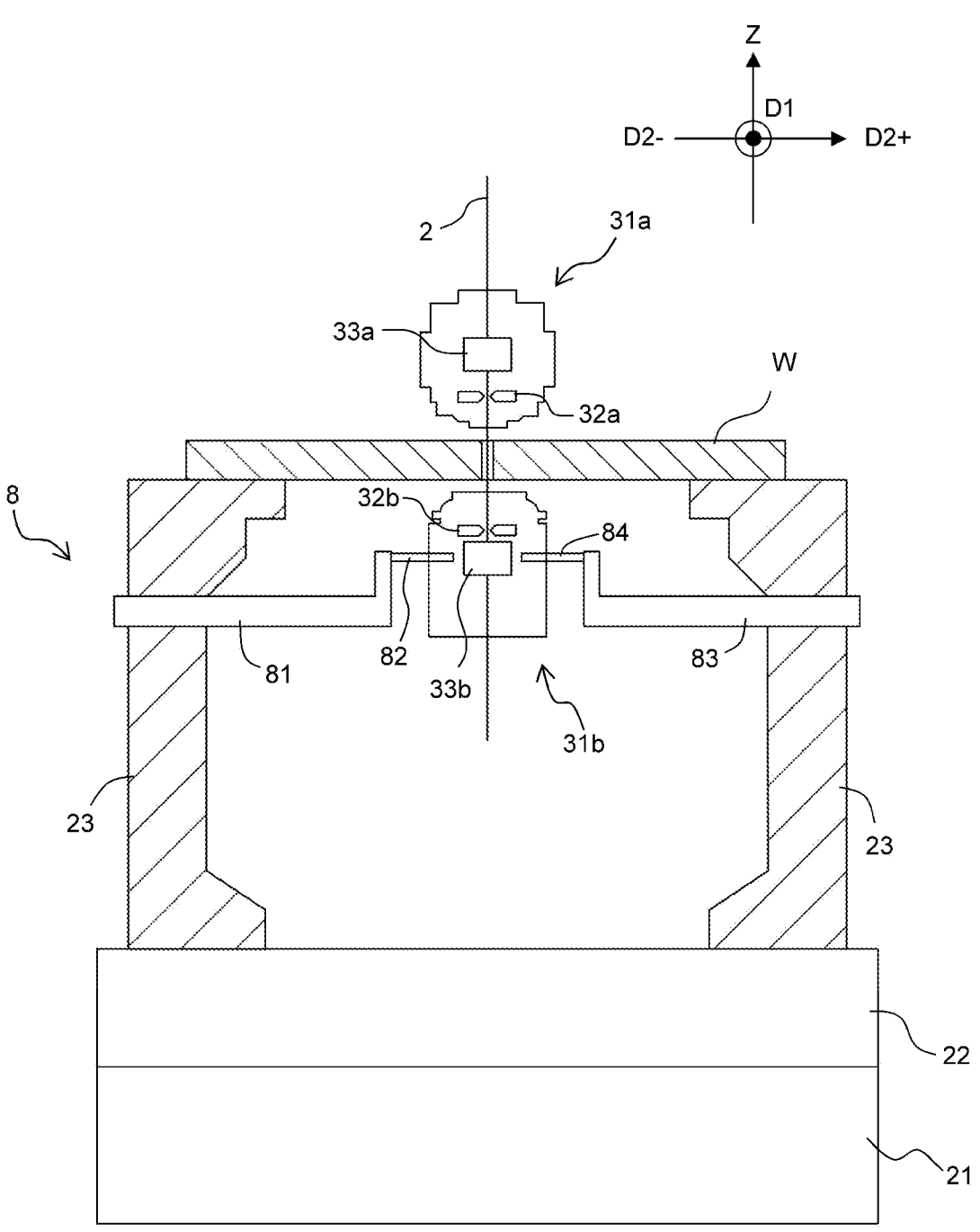
FIG. 12 is a schematic view illustrating a configuration of the pressing device 8 according to another embodiment.

In the above embodiment, the first pin 82 protruding toward D2+ along the second direction D2 is provided in the pressing device 8. As another mode, a second pressing pin 84 pressing the lower power conductor 33*b* in a direction opposite to the first pressing pin 82 may also be provided. For example, as shown in FIG. 12, by using two opposite support pillars, which sandwich the lower guide device 31*b*, of the work stand 23 fixing the workpiece W, the first pressing pin 82 and the second pressing pin 84 can be disposed. A body part 83 of the second pressing pin 84 is linked to the support pillar opposite to the support pillar to which the first pressing pin 82 of the horizontally movable work stand 23 is fixed, and the second pressing pin 84 is provided to be continuous from the body part 83 and protrude toward D2– along the second direction. The first pressing pin 82 and the second pressing point 84 are disposed to sandwich the lower power conductor 33*b* in the second direction D2.

The second pressing pin 84 is inserted into the accommodation space 42*d* from the opening part 42*d*2 of the guide block 42 of the lower guide device 31*b*, and can move the lower power conductor 33*b* toward D2– in the second direction D2 by pressing the end surface 33*b*2 of the lower power conductor 33*b* with the tip of the second pressing pin 84.

Since the lower power conductor 33*b* can be directly moved toward D2– of the second direction by using the second pressing pin 84, the movement of the movement device can be controlled simply.

In addition, although the above embodiment uses a plate-shaped power conductor, the shape of the power conductor is not limited thereto. It suffices as long as the power conductor is in a shape having a predetermined length in the second direction D2 and movable along the second direction D2 in the accommodation space 42*d*. For example, a power conductor in a round bar shape or a polygonal prism shape can also be used.

In the case where the fixing and movement mechanism of the lower power conductor 33*b* in the above embodiment is applied to the upper power conductor 33*a*, a horizontal axis direction (third direction) in which the upper power conductor 33*a* moves to contact or away from the wire electrode 2 may be consistent with or different from the first direction D1 as a horizontal axis direction in which the lower power conductor 33*b* moves to contact or away from the wire electrode 2. Together with this, a horizontal axis direction (fourth direction), which is a horizontal axis direction in which the upper power conductor 33*a* moves relatively with respect to the upper guide device 31*a*, that is orthogonal to the third direction may be consistent with or different from the second direction in which the lower power conductor 33*b* moves relatively with respect to the lower guide device 31*b*.

Although the exemplary embodiments of the invention have been described above, the invention is not limited to the embodiments, and various design changes are possible within the scope of the claims.

What is claimed is:

1. A wire electric discharge machining apparatus, comprising a wire electrode, an upper guide, and a lower guide device, wherein the upper guide and the lower guide device are respectively disposed on an upper side and a lower side of a workpiece to sandwich the workpiece along a vertical direction, and guide the wire electrode, the lower guide device comprises a power conductor, and a fixing device fixing the power conductor at a predetermined position in the lower guide device, the power conductor moves in a first direction that is a horizontal axis direction and supplies power by contacting the wire electrode, the fixing device is configured to be switchable between a fixed state, in which a relative movement of the power conductor with respect to the lower guide device in a second direction that is another horizontal axis direction orthogonal to the first direction is not possible, and a non-fixed state in which the relative movement of the power conductor with respect to the lower guide device in the second direction is possible, and the wire electric discharge machining apparatus comprises: a pressing device comprising a pressing pin, configured to be relatively movable with respect to the lower guide device and press the power conductor in the non-fixed state to move in the second direction; and a movement device, relatively moving the pressing device with respect to the lower guide device, wherein the fixing device comprises a power cylinder and a biasing member, the biasing member is disposed to bias the power conductor in the first direction, in the fixed state, the power cylinder resists a biasing force of the biasing member to push the power conductor toward the wire electrode in the first direction and fix the power conductor, and in the non-fixed state, the biasing member pushes the power conductor away from the wire electrode in the first direction.

2. The wire electric discharge machining apparatus as claimed in claim 1, wherein the fixing device is configured to be able to reciprocally move the power conductor in the first direction.

3. The wire electric discharge machining apparatus as claimed in claim 1, wherein the lower guide device comprises a guide block, the guide block accommodates the power conductor in an accommodation space formed in the guide block, and in the fixed state, the power cylinder pushes the power conductor to abut against a wall surface of the accommodation space and fixes the power conductor.

4. The wire electric discharge machining apparatus as claimed in claim 1, wherein the pressing device comprises: a body part linked to the movement device; and a pressing pin provided continuously from the body part, and protruding in a direction of the second direction from the body part so that a tip of the pressing pin is abuttable against the power conductor in the lower guide device.

5. The wire electric discharge machining apparatus as claimed in claim 4, wherein the pressing pin is provided to be movable to a retracted position not interfering with the lower guide device during electric discharge machining of the workpiece.

6. The wire electric discharge machining apparatus as claimed in claim 4, wherein in the pressing device, the pressing pin is set as a first pressing pin and the body part is set as a first body part, the pressing device further comprises: a second body part linked to the movement device; and a second pressing pin, provided continuously from the second body part, and protruding in an other direction of the second direction from the second body part, so that a tip of the second pressing pin is abuttable against the power conductor in the lower guide device, and the first pressing pin and the second pressing pin are disposed to sandwich the power conductor in the second direction.

7. The wire electric discharge machining apparatus as claimed in claim 1, wherein the upper guide comprises a power conductor and a fixing device, the power conductor moves in a third direction that is a horizontal axis direction and supplies power by contacting the wire electrode, the fixing device is configured to be switchable between a fixed state, in which a relative movement of the power conductor with respect to the upper guide in a fourth direction that is another horizontal axis direction orthogonal to the third direction is not possible, and a non-fixed state in which the relative movement of the power conductor with respect to the upper guide in the fourth direction is possible, and the wire electric discharge machining apparatus comprises: a pressing device, configured to be relatively movable with respect to the upper guide and press the power conductor in the non-fixed state to move in the fourth direction; and a movement device, relatively moving the pressing device with respect to the upper guide.

8. A wire electric discharge machining apparatus, comprising a wire electrode, an upper guide, and a lower guide device, wherein the upper guide and the lower guide device are respectively disposed on an upper side and a lower side of a workpiece to sandwich the workpiece along a vertical direction, and guide the wire electrode, the lower guide device comprises a power conductor, and a fixing device comprising a power cylinder and fixing the power conductor at a predetermined position in the lower guide device, the power conductor moves in a first direction that is a horizontal axis direction and supplies power by contacting the wire electrode, the fixing device is configured to be switchable between a fixed state, in which a relative movement of the power conductor with respect to the lower guide device in a second direction that is another horizontal axis direction orthogonal to the first direction is not possible, and a non-fixed state in which the relative movement of the power conductor with respect to the lower guide device in the second direction is possible, and the wire electric discharge machining apparatus comprises: a pressing device, configured to be relatively movable with respect to the lower guide device and press the power conductor in the non-fixed state to move in the second direction; and a movement device, relatively moving the pressing device with respect to the lower guide device, wherein the pressing device comprises: a body part linked to the movement device; and a pressing pin provided continuously from the body part, and protruding in a direction of the second direction from the body part so that a tip of the pressing pin is abuttable against the power conductor in the lower guide device, wherein in the pressing device, the pressing pin is set as a first pressing pin and the body part is set as a first body part, the pressing device further comprises: a second body part linked to the movement device; and a second pressing pin, provided continuously from the second body part, and protruding in an other direction of the second direction from the second body part, so that a tip of the second pressing pin is abuttable against the power conductor in the lower guide device, and the first pressing pin and the second pressing pin are disposed to sandwich the power conductor in the second direction.

9. The wire electric discharge machining apparatus as claimed in claim 8, wherein the fixing device is configured to be able to reciprocally move the power conductor in the first direction.

10. The wire electric discharge machining apparatus as claimed in claim 8, wherein the pressing pin is provided to be movable to a retracted position not interfering with the lower guide device during electric discharge machining of the workpiece.

11. The wire electric discharge machining apparatus as claimed in claim 8, wherein the upper guide comprises a power conductor and a fixing device, the power conductor moves in a third direction that is a horizontal axis direction and supplies power by contacting the wire electrode, the fixing device is configured to be switchable between a fixed state, in which a relative movement of the power conductor with respect to the upper guide in a fourth direction that is another horizontal axis direction orthogonal to the third direction is not possible, and a non-fixed state in which the relative movement of the power conductor with respect to the upper guide in the fourth direction is possible, and the wire electric discharge machining apparatus comprises: a pressing device, configured to be relatively movable with respect to the upper guide and press the power conductor in the non-fixed state to move in the fourth direction; and a movement device, relatively moving the pressing device with respect to the upper guide.

\* \* \* \* \*